Figure 1:
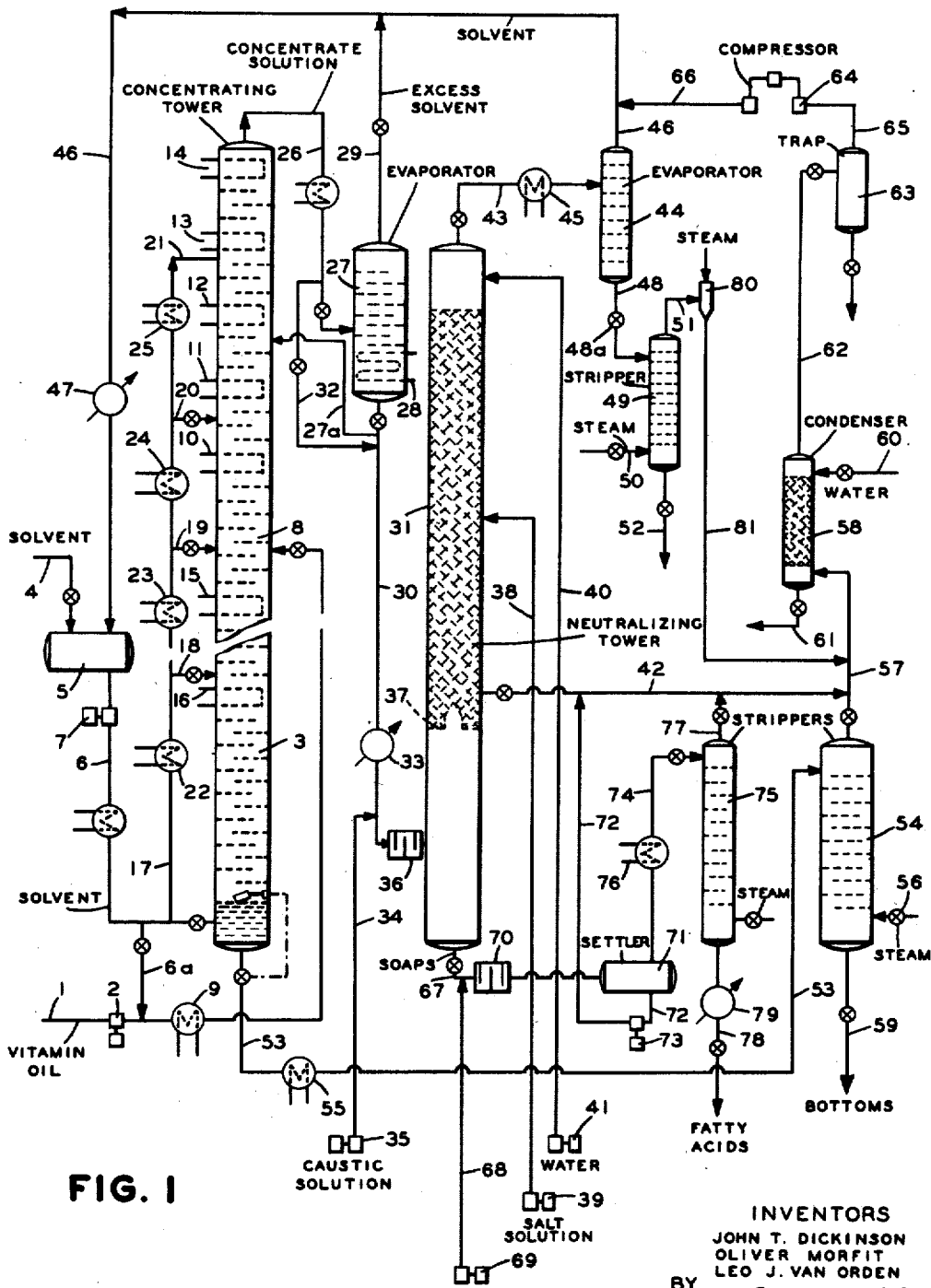

INVENTORS
JOHN T. DICKINSON
OLIVER MORFIT
LEO J. VAN ORDEN
ATTORNEYS

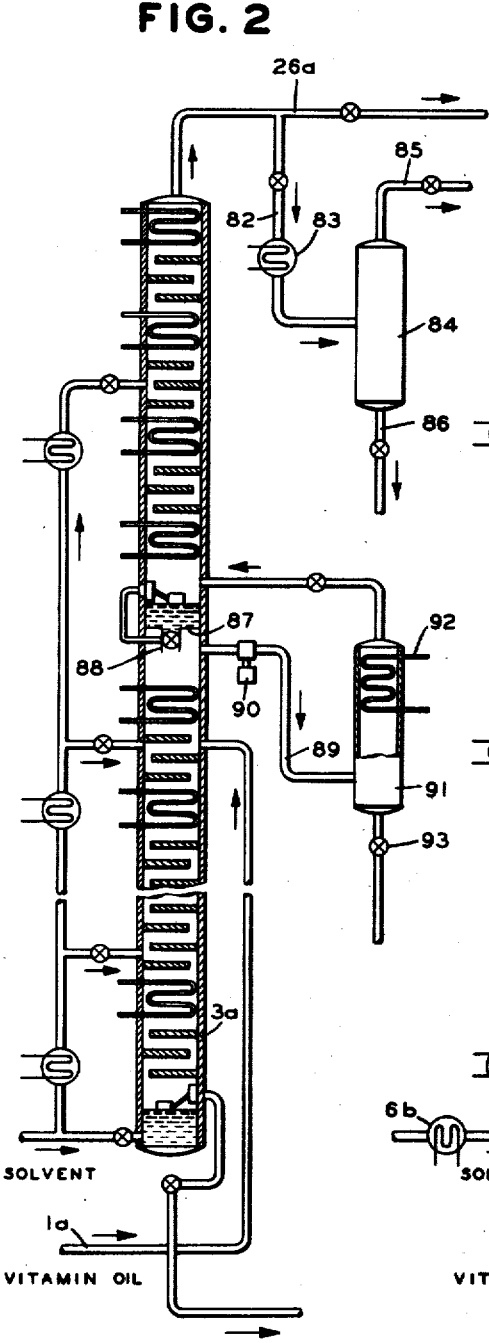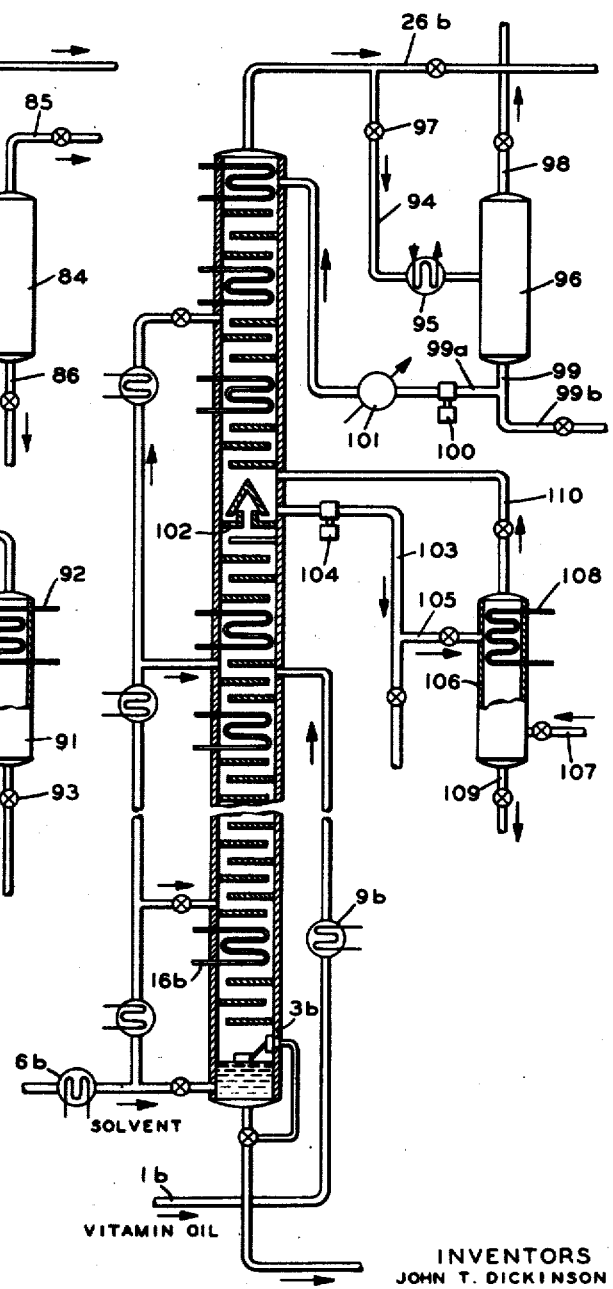

Patented Mar. 7, 1950

2,499,991

UNITED STATES PATENT OFFICE 2,499,991

METHOD FOR CONCENTRATING VITAMINS BY SOLVENT FRACTIONATION

John T. Dickinson, Basking Ridge, N. J., Oliver Morfit, Scarsdale, N. Y., and Leo J. Van Orden, Bloomfield, N. J., assignors to The M. W. Kellogg Company, Jersey City, N. J., a corporation of Delaware Application June 29, 1948, Serial No. 35,768

14 Claims. (Cl. 167—81)

This invention relates to a process for preparing a concentrate of a vitamin A and/or vitamin D from oils containing said vitamins by contacting such oils with a low-boiling solvent under temperature conditions near the critical temperature of the solvent in order to establish conditions of marginal solubility for components of said oil, and fractionate into extract and raffinate phases. More particularly, the invention relates to a method for continuously concentrating most of the vitamins in a small extract fraction by counter-currently contacting the extract phase with a vitamin concentrate. In the preferred form of the invention, the conditions of operation are regulated in accordance with a formula developed herein.

This application is a continuation-in-part of the following prior U. S. application of the same inventors: S. N. 457,896, filed September 10, 1942, now abandoned; S. N. 520,344, filed January 29, 1944, now abandoned.

The oils which are treated in the improved process include all oils containing vitamin A and/or vitamin D. The invention includes within its scope the treatment of any oils suitable for the separation of said vitamin concentrates therefrom but it is particularly applicable in the treatment of fish oils for the concentration of vitamin A and vitamin D. An important application of the invention in the treatment of fish oils is the recovery of concentrates of vitamin A from liver oils, such as shark liver oil and the recovery of concentrates of vitamins A and D from liver oils containing both vitamins, such as cod liver oil and halibut liver oil. However, the treatment of fish body oils, which ordinarily are of low potency, represents another important application of the invention because such oils are available in much larger quantities than the liver oils. Many fish body oils contain vitamin D but in low concentrations. These oils and similar low-potency oils are not suitable as a source of concentrates of vitamins A and D by known methods. Prominent among the fish body oils which are available in large quantity are sardine oil and menhaden oil.

The oils which are treated in accordance with this invention are obtained from the source material by any of the usual means, such as hot pressing, with or without preliminary digestion, cold pressing and solvent extraction. Preferably the oil is obtained from the source material by methods which effect the least change in the chemical constitution of the oil, particularly in respect to the vitamin constituents. Prior to treatment in accordance with this invention the oil may be subjected to a preliminary concentration treatment by any method, but this is ordinarily not necessary or desirable.

The improved method involves in general the treatment of the vitamin oil at moderate or low temperatures by means of a selective solvent under conditions effective to maintain the solvent in a liquid condition and to dissolve only a portion of the oil in the solvent, whereby there are formed two liquid phases whose oil components have greater and lesser vitamin concentrations than the original vitamin oil. The temperatures of the process do not ordinarly exceed 450° F., and hence heat decomposition of the vitamins is avoided.

The solvents which may be employed includes fluids which are inert with regard to the oils treated and which have a much lower boiling point and a much lower density. The preferred solvents may be designated generally as those having critical temperatures not substantially higher than 450° F. or, stated otherwise, as not above about 450° F.

To carry out the concentrating step under conditions of the greatest efficiency it is desired to operate at temperatures at which the solubility of the oil with the solvent decreases with rising temperature. This condition occurs generally in the range of temperatures extending from 100° F. below the critical temperature of the solvent to a few degrees above the critical temperature of the solvent, (i. e. near the critical temperature of the solvent); this range will be referred to as the paracritical range. In the paracritical range, the density of the solvent and hence its solvent power decreases with increasing temperature so that, given proper conditions of solvent to oil ratios, refluxing, etc., uniquely accurate solvent fractionation is possible. Operating in the paracritical range, and particularly at temperatures close to the critical temperature, requires the use of solvents whose critical temperatures are substantially lower than temperatures which are destructive of the vitamin content of the oil. The preferred solvents include those whose critical temperatures are below 325° F. In this group the solvents which are normally gaseous are preferable because of the relative ease with which they are separated from the oil after the treatment as well as for the low operating temperatures which they permit.

The low boiling hydrocarbons represent a desirable class of solvents because of their relative inertness and low cost. While the low boiling olefin hydrocarbons may be employed they are less desirable than the low boiling paraffins such as ethane, propane, the butanes, the pentanes and the hexanes, from the point of view of inertness. Of the paraffins, propane is preferred ordinarily because of the high degree of solubility of the oils in that solvent. However, ethane or the butanes can be employed to almost as great advantage. While relatively pure hydrocarbons are preferred mixtures of them may be employed. For example, mixtures of ethane and propane or mixtures of butane and methane may be employed in the proportions suitable to form solvents having the desired properties. While the low boiling hydrocarbons are particularly advantageous for use as solvents in the improved method other solvents having relatively low critical temperatures may be employed, such as ammonia, dichlordifluor methane, dimethyl ether, methyl fluoride and halogenated hydrocarbons in general.

Under certain conditions, it is essential that the solvent be extremely stable and that there be no danger of explosion or chemical reaction. In such cases, liquid carbon dioxide may be employed. Carbon dioxide also makes it possible to fractionate at lower temperatures than most of the solvents mentioned above.

In the further description of the invention propane will be referred to as the solvent. It will be understood, however, that propane merely exemplifies many solvents which may be employed under proper conditions of temperature and pressure and that the general principles of the invention, as exemplified by the use of propane, are applicable in the use of such other solvents. In the preferred method of carrying out the process, the vitamin oil is subjected to counter-current contact with liquefied propane in order to dissolve enough of the oil to bring substantially all of the vitamin content into the extract phase. In some cases it may be necessary to dissolve all of the incoming charge oil. That part of the zone in which this dissolving step occurs generally lies between the lower end and the charge oil inlet and is referred to herein as the stripping zone. Once an extract phase containing substantially all of the vitamin component has been formed it is flowed upwardly in counter-current contact with a denser downflowing oil having a vitamin concentration substantially higher than that of the charge oil; this counter-current contact serves to rectify the upflowing extract phase since non-vitamin components are displaced and precipitated from the extract phase in the presence of an excess of the desired vitamin component. If the conditions of the process are properly regulated, the downflowing rectification oil may be obtained by treating the extract phase to precipitate a portion of the dissolved oil. The rectification part of the process ordinarily takes place between the charge oil inlet and the extract phase outlet; this part of the fractionation zone is frequently referred to herein as the rectification zone.

In the rectification zone the solvent power of the extract or propane phase for the less soluble constituents of the oil is lessened during the upward passage of the extract phase through the rectification zone and the precipitate is passed continuously in the reverse direction through the rectification zone in intimate contact with the oppositely flowing extract phase. This results in continuous precipitation, re-solution and re-precipitation of the oil. The solvent power of the extract phase for the less soluble portions of the oil is lessened by changing the temperature of the propane phase, by changing the pressure, or by preferentially dissolving in the extract phase portions of the oil which are more soluble therein than some of the oil previously dissolved in the propane phase. The methods involving control of the temperature and the pressure may be employed independently, but each also involves the preferential resolution in the extract phase of portions of the oil which are more soluble therein than some of the oil previously dissolved when the oil phase formed by precipitation is flowed through a rectification zone in counter-current contact with the extract phase. However, rectification of the extract phase can be effected without varying the temperature or pressure.

The vitamin concentrating process is carried out in a vertically extended fractionation zone having a solvent inlet and a raffinate phase outlet near the lower end and an extract phase outlet near the upper end, a charge oil inlet in the intermediate portion of the zone, and, in most cases, a reflux inlet above said charge oil inlet. Preferably, the concentration is carried out in a vertical tower to take advantage of the difference in gravity of the propane and the oil in effecting counter-current contact of the phases; but it is conceivable that the process might be accomplished in a variety of apparatus, and it is not limited to any particular form of apparatus but may be employed in any system in which a light upflowing extract phase can be counter-currently contacted by heavier downflowing liquid. The process may be carried out by pumping the propane and oil counter-currently through a series of separate contact zones which may or may not be maintained under the same conditions of temperature and pressure.

An important point of novelty of the present invention is that rectification of the upflowing extract phase is carried out in the presence of a downflowing reflux oil containing vitamins in greater quantity than the charge oil. Stated differently, the rate at which vitamins flow downwardly in the reflux oil is greater (at some point in the fractionation zone) than the rate at which these vitamins are introduced into the fractionation zone in the charge oil. Note that it cannot be said that the downward flow rate of reflux vitamins is at every point in the fractionation zone greater than the rate at which vitamins are charged to the tower. The quantity of reflux oil is a maximum at some point in the fractionation zone and steadily diminishes as it flows downwardly from that point. In the present process, the rate at which vitamins flow downwardly at the point of maximum reflux oil flow exceeds the rate at which vitamins are charged to the tower. Naturally, as the vitamins are reabsorbed from the downflowing reflux oil by the upflowing extract phase, the total downflowing vitamins will diminish in quantity preferably to zero. The location of the point of maximum downflow or reflux oil will be determined by the manner in which refluxing is accomplished. There are two ways generally employed for providing reflux oil. The first is to provide a gradient of increasing temperature with altitude, preferably in that part of the fractionation zone between the charge oil inlet and the extract phase outlet; in this case, the maximum flow of reflux oil will be located at some point determined by the temperature gradient. Secondly, reflux oil may be introduced into the fractionation zone through a reflux oil inlet located at some point in the fractionation zone above the charge oil inlet, preferably near the extract phase outlet. Ordinarily, the reflux oil is extra oil, i. e. it is obtained by evaporating solvent from the extract phase; if reflux is obtained principally in this manner, the downflow of reflux vitamins will be at a maximum at the reflux oil inlet.

In addition to providing reflux oil in sufficient quantity, it is necessary that the reflux be more concentrated in vitamins than the charge oil. This statement must be qualified, of course, since it refers to the reflux in the upper part of the fractionation zone in which rectification occurs; some of the reflux oil actually flows past the charge oil inlet and down to the raffinate, but such oil is ordinarily depleted of most of its vitamin content on its way down. The careful stripping, not merely of the charge oil, but even more importantly of the downflowing reflux oil is carried out in the present process by a much higher volume of solvent than that employed in previously known solvent fractionation systems with normally gaseous solvents. In the present method at least 20 volumes of solvent are introduced through the solvent inlet for each volume of oil introduced through the oil inlet. Indeed, solvent-oil ratios of 50:1 are preferred and a solvent to oil ratio of 100 is not unusual, although it is the maximum. In previously known processes the volume ordinarily did not exceed ten times that of the oil.

The invention will be described in detail by reference to the accompanying drawings which show a vertical tower but it will be understood that the operation described in connection with such a tower is applicable also to an extraction process carried out in a series of separate zones.

Figure 4:
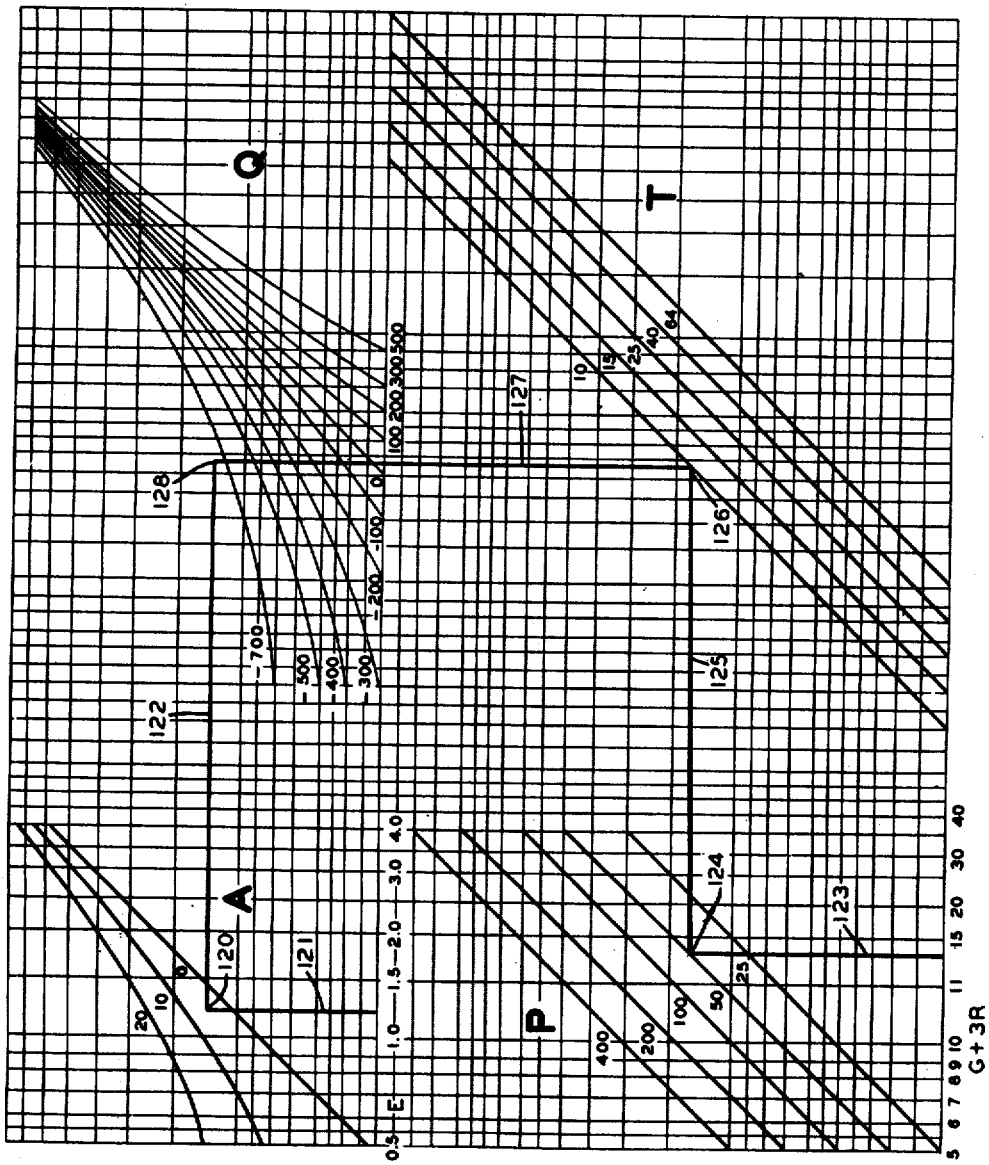

In the drawings Fig. 1 is a diagrammatic view in elevation of an arrangement of apparatus for processing a vitamin oil to separate therefrom, and obtain in the solvent phase, a fraction of the oil having a relatively high vitamin potency. Figs. 2 and 3 are diagrammatic cross-sectional views in elevation of a concentrating tower illustrating modified forms of operation of the process illustrated by Fig. 1. Figure 4 is a graphical means for selecting operating conditions to achieve a desired result in accordance with the present invention.

In the further description of the process in detail reference is made to the drawings. It will be understood, however, that the invention is not limited to such modifications as are illustrated by the drawings but is capable of other modifications which may be beyond the physical limitations of the apparatus represented in the drawings, as will be made apparent in the description. For example, the drawings illustrate the processing of vitamin oils in an elongated vertical concentrating tower through which the solvent and oil are passed counter-currently in intimate contact. The invention is not limited to contacting the oil and solvent in a continuous counter-current tower but may be carried out by any means which provide for contacting the oil and solvent under conditions effective to form two phases between which the oil is distributed in a manner to provide in one of the phases the desired vitamin concentrate. For example, the process may be carried out by passing the oil and the solvent continuously and counter-currently through a series of vessels which are maintained at the same or different conditions of temperature and pressure. Under such conditions the number of vessels which is required is decreased or increased in accordance with the desired degree of concentration of the vitamin content of the oil and the proportion of the vitamin content of the oil which it is desired to recover in the concentrate.

Referring to Fig. 1 a vitamin containing oil which is normally a fish oil, although it may be an animal oil or a vegetable oil, is introduced continuously into the system through line 1 which is provided with a pump 2. Line 1 connects with a vertical elongated concentrating tower 3 at an intermediate point in the tower.

The propane which is to be employed as the solvent, in the modification of the invention illustrated by the drawings, is introduced into the system through line 4 which connects with a storage drum 5. From storage drum 5 liquid propane is transferred continuously at the required rate through line 6 by means of pump 7 to the bottom of tower 3. The liquefied propane flows upwardly through tower 3 as a substantially continuous stream to the top of the tower. The vitamin oil which is introduced into the tower through line 1 is contacted with the propane stream at point 8. Under normal conditions of operation the oil is partially dissolved in the propane stream at point 8 and that portion which is undissolved begins to flow downwardly in tower 3 from point 8 in counter-current contact with the upwardly flowing stream of propane. This counter-current flow of the liquid phases is brought about in the tower as a result of the difference in gravity between the undissolved phase and the propane phase and by regulation of the upward linear velocity of the propane stream to permit settling of the oil phase. The propane stream dissolves a substantial proportion of the oil while a smaller proportion of the propane is absorbed by the undissolved oil. The separate liquid phases thus formed may be referred to with reasonable accuracy as the propane phase and the oil phase since the former principally comprises propane and the latter contains a much larger proportion of oil than does the former.

As the oil phase flows downwardly in tower 3 from the oil charge point at 8 there is prolonged and intimate contact between the downwardly flowing oil phase and the upwardly flowing propane stream, which is promoted with baffles or other suitable means for promoting contact of the phases. As a result of such prolonged contact and as a result of contact of the oil phase with propane which is increasingly less saturated with respect to oil further amounts of the oil are dissolved in the propane phase. The temperature and the time of contact of the phases in the portion of the tower between point 8 and the bottom, which may be described as the stripping zone, are regulated to absorb in the propane phase substantially all portions of the oil which may be desired in the overhead product. Consequently the oil phase reaches the bottom of the tower and is withdrawn only after it is stripped of all vitamin constituents in excess of the residual amount which is regarded as permissible in the bottom product.

The rate of withdrawal of the oil phase from the bottom of tower 3 is regulated to maintain any desired level of the oil phase in the bottom of the tower. The reservoir of the oil phase which is maintained in the bottom of the tower forms an interface with the propane phase, the latter being substantially continuous in that portion of the tower above the reservoir of the oil phase. The interface between the continuous phases may be maintained below the point at which the propane is charged into the bottom of the tower or it may be maintained at a substantial height in the tower above the propane charging point. With certain oils a high interface may be desirable to effect the desired stripping of the constituents from the oil.

As the propane phase flows upwardly in the tower through the stripping zone it absorbs a substantial amount of oil from the downwardly flowing oil phase. As the propane phase flows past the oil charge point at 8 it has its final contact with the residue of the charge oil. At that point the propane phase contains a high proportion of the more soluble portions of the oil, including vitamin constituents such as vitamin A and vitamin D. However, it may also contain so large a proportion of the oil that the potency of the oil content of the propane phase at point 8 in these vitamins is less than desired. Consequently the propane phase is treated to precipitate a portion of the oil dissolved therein while retaining most of the desired vitamin constituents in solution. To obtain this result it is desirable to subject the propane phase in that portion of tower 3 above point 8 to intense rectification, that part of the tower being referred to for convenience as the rectification zone.

It had been pointed out above the rectification in tower 3 may be accomplished by lessening the solvent power of the propane phase for the less soluble constituents of the oil as the propane phase flows upwardly through the tower toward the exit at the top of the tower. This may be effected in the tower by raising the temperature of the propane phase above the oil charge point or by preferentially dissolving in the propane phase above point 8 portions of the oil which are more soluble in the propane phase than some of the oil which is carried by the propane phase into the rectification zone. Rectification could be accomplished also by pressure adjustment, as dividing the rectification zone of tower 3 into a series of separate compartments by means not shown. The propane phase would be passed through such separate compartment at progressively lower pressures to effect precipitation of a part of the oil in each compartment. The precipitate in each compartment would be pumped into the next lower compartment into contact with the propane phase therein. This method of operation, however, is less desirable than the other methods as it requires more elaborate equipment and is less efficient.

In accordance with the modification of the invention which is illustrated in Fig. 1, the propane phase is heated in the rectification zone to a higher temperature to effect precipitation therein of a portion of the oil previously dissolved in the propane phase. This heating may be accomplished by the insertion of one or more heating means, such as heating coils 10, 11, 12, 13 and 14 shown diagrammatically in Fig. 1. While these coils are shown as spaced relatively uniformly along the length of the rectification zone it is to be understood that the process does not preclude the application of heat to the propane phase at one or more points below the oil charge point, as is shown by the provision of heating coils 15 and 16.

It is preferred in the improved process to pass the propane through tower 3 at temperatures at which the solubility of the vitamin oil in the propane decreases with rising temperature. The lowest temperature in the tower is maintained in the bottom of the tower and this temperature is fixed ordinarily by the temperature at which the propane is charged to the tower. Suitable temperature control means may be provided in line 6 to maintain the entering propane stream at the desired minimum tower temperature. The propane phase may be heated from the minimum temperature to the highest temperature desired at 10, 11, 12, 13 or 14 whereby all the oil with which it is desired to reflux the tower is precipitated at one of these points. However, in order to avoid flooding the tower by release of a large quantity of precipitated oil at a single point and in order to intensify the rectification of the propane phase it is desirable to heat the propane phase to successively higher temperatures as it passes over heating elements 10, 11, 12, 13 and 14, at which last point it reaches the highest temperature. In this manner precipitation is induced along the length of the reaction zone in a substantially uniform manner and the application of heat necessary to raise the temperature of the propane phase to the maximum temperature is simplified.

In place of, or in addition to, heating means 10 to 16, inclusive, other means may be provided to regulate the temperature of the propane phase in tower 3. For example, a portion of the propane stream may be diverted from line 6 through line 17 and introduced into tower 3 at upper points thereof through branch lines 18, 19, 20 and 21. While propane may be introduced at these upper points of tower 3 at the bottom temperature it is desirable to provide heating means as indicated at 22, 23, 24, and 25 whereby the propane is preheated suitably to provide the temperature desired in the tower at each point of introduction of the propane. In addition to the introduction of heat into the tower by direct application, or by means of the propane stream, the vitamin oil may be preheated as indicated at 9 to the temperature desired at the oil charge point or to a higher temperature, to assist in heating the propane phase to the desired higher temperature.

As the propane phase flows upwardly in the rectification zone and is heated to increasingly higher temperature there is a substantially continuous precipitation of a separate oil phase which contains propane in a substantially lower proportion than in the propane phase. This separate oil phase consequently has a higher specific gravity than the propane phase and flows downwardly through the tower in counter-current contact with the upwardly rising propane phase. The linear velocity of the propane phase is regulated to permit this counter-current flow. Intimate contact of the phases in the rectification zone is promoted by the provision of suitable baffles or other means.

The separate oil phase which is formed by precipitation in the rectification zone flows downwardly in that zone into contact with a part of the stream of the propane phase which is at a lower temperature than that portion of the propane stream from which the oil was precipitated. Since the oil is more soluble in the propane at the lower temperature at least a portion of the oil precipitated at the higher temperature is redissolved in the propane phase at the lower temperature. There is at the same time a corresponding precipitation of less soluble portions of the oil content of the propane phase at the point of lower temperature. This results from two causes. One cause is the absorption by the propane phase of more soluble oil constituents. Since the oil is substantially saturated this results in corresponding precipitation of less soluble oil constituents. The second cause for precipitation of oil at the point of lower temperature is the heating of the oil phase at that point from a still lower temperature. Consequently the refluxing of the tower which is induced by the temperature gradient above the oil charge point is intensified by the precipitation of less soluble oil constituents in favor of absorption of more soluble oil constituents.

There is formed in this manner in the rectification zone of tower 3 a relatively heavy oil phase which resembles the oil phase in the stripping zone below the oil charge point at 8 in that it has a relatively low ratio of propane to oil as compared to the propane phase. As the oil phase flows downwardly in the rectification zone it is subjected constantly to the stripping action of the propane phase whereby the more soluble portions of the oil are redissolved. This is balanced, however, by constant acretions to the oil phase in the form of additional precipitate. At the oil charge point the oil formed in the rectification zone merges with the oil charge and forms a part of the oil phase flowing downwardly through the stripping zone.

The rectification of the propane phase and the oil phase described above as occuring in that portion of tower 3 above the oil charge point 8 is not necessarily limited to that part of the tower. The oil phase flowing downwardly in the stripping zone below point 8 contains all of the least soluble portion of the oil charge. Consequently extraction or stripping may be said to be the predominating effect in this zone. However, the passage of oil precipitated in the rectification zone into the stripping zone has some effect in refluxing the portion of the tower occupied by the stripping zone whereby less soluble portions of the oil which are dissolved by the propane stream at a low point in the tower are precipitated at an upper point in the stripping zone in favor of the absorption of more soluble oil constituents. As the propane stream passes up through the stripping zone it absorbs more and more oil and reaches a degree of concentration of oil which represents saturation of the propane phase at the existing temperature and pressure. Consequently any additional quantities of oil dissolved by the propane phase are balanced by a corresponding precipitation by less soluble portions of the oil. Oil which is precipitated from the propane phase in the stripping zone passes into the downwardly flowing oil phase. Rectification in the stripping zone can be intensified also by heating the propane phase as it passes through that portion of the tower as illustrated by the provision of heating means 15 and 16.

While the oil and propane are introduced separately into the tower under ordinary conditions of operation some premixing of oil and propane prior to charging the oil to the tower may be effected in order to lower the viscosity of the oil and thus increase the efficiency of contact between the oil and the propane in the tower. For example, line 6a connecting line 6 with line 1 may be provided to permit mixing a minor proportion of propane with the vitamin oil feed to tower 3.

The tower is divided into the stripping zone and the rectification zone by the connection between line 1 and tower 3. The vertical location of this point may be varied in accordance with the character of the oil to be treated and the degree of concentration desired. Since any given tower has a fixed vertical dimension the movement downwardly of the point of introduction of the oil provides for more intensive rectification of the concentrate at the expense of the stripping treatment. Conversely, upward movement of the point of oil decreases the degree of rectification but amplifies the stripping treatment so that a greater yield of the vitamin content in the oil in the overhead product is achieved.

The maximum temperature employed in the concentrating tower is maintained ordinarily at the top of the tower. This temperature may be higher than the critical temperature of the solvent, but it is preferred ordinarily to employ a top temperature which is at or below the critical temperature of the solvent. The temperatures ordinarily employed fall within the range of temperature between the critical temperature and 40° F. below the critical temperature. In this range relatively low temperatures are employed for the top of the tower when operating to produce a relatively small concentration of the vitamin content of the oil feed, whereas higher temperatures are employed to achieve greater concentrations. The top temperature in the rectification zone, which is the temperature at which the solvent stream leaves the tower, is maintained at the level at which the desired proportion of the vitamin oil charge remains absorbed in the vitamin phase. As the proportion of the oil absorbed in the propane phase is greater when relatively high ratios of solvent to oil are employed it is evident that the higher top temperatures are permissible when using relatively high ratios of solvent to oil. This facilitates the use of a wide temperature gradient whereby intensive refluxing of the tower is effected.

The bottom temperature in the concentrating tower is maintained sufficiently low to facilitate stripping from the oil phase of substantially all constituents which it is desired to include in the overhead product. However, this temperature must be maintained above any temperature at which there occurs complete solubility of the oil in the solvent. The preferred bottom temperatures ordinarily are 40° F. or more below the critical temperature of the solvent.

The temperature in the tower may be maintained substantially uniform throughout the stripping zone, that is, the portion of the tower below the oil charge point. This promotes maximum stripping of the oil phase by the propane phase. However, as is pointed out above a temperature gradient may be maintained also in the stripping zone. Ordinarily a temperature gradient of at least 10° F. is necessary between the oil charge point and the top of the tower to produce sufficient rectification. The temperature gradient below the oil charge point ordinarily is not as great as the temperature gradient above the oil charge point, but it may be desirable to maintain tower 1 at a uniform temperature gradient from top to bottom.

When employing propane as the solvent a top temperature of 170 to 210° F. ordinarily is satisfactory to produce sufficient concentration of vitamins A and D in fish oil. For this operation bottom temperatures of 160 to 170° F. are sufficiently high. The temperature at the oil charge point may be the same or slightly higher than the bottom temperature.

The pressure on the concentrating tower is maintained sufficiently high to insure liquid phase conditions during the operation. Since it may be desirable to make some adjustment of the pressure during the operation it is desirable to maintain the pressure at a substantial margin above the minimum necessary to maintain liquid phase conditions. Ordinarily a pressure which is about 50 pounds per square inch higher than the vapor pressure of the solvent at the highest contemplated operating temperature is satisfactory.

It is preferred to charge the solvent and the oil to tower 3 at a relatively high volumetric ratio of solvent to oil. The volumetric ratio should be sufficiently high to effect solution of the oil in the solvent in the bottom of the tower to the maximum degree necessary to maintain the inclusion of vitamins in the bottom product at the permissible low level. As is pointed out above a high ratio of solvent to oil permits a high top temperature which facilitates refluxing the tower. The ratio of propane to oil should be at least 10:1 and in the treatment of fish oils substantially higher ratios are desirable, such as 30:1 to 100:1 or higher.

The details of the operation of concentrating tower 3 described thus far relate particularly to the treatment of fish oils containing vitamin A or vitamin D, or both, to produce a concentrate of such vitamins. The fractionation of the oil in tower 3 appears to proceed in accordance with molecular weight is so far as related compounds are concerned but a separation also is effected between compounds of similar molecular weight but of different chemical constitution. In general the concentration of the fish oils in the manner described above effects a concentration of the unsaponifiable constituents of the oil in the overhead product. Vitamins A and D appear to be associated with the unsaponifiable constituents of the oil and are concentrated in the overhead product along with the unsaponifiables. It does not follow, however, that the degree of vitamin concentration possible is limited to the proportion of unsaponifiable constituents in the oil. While the unsaponifiables are present ordinarily in the fish oil in such a small proportion that they are concentrated in the overhead to approximately the same degree as the vitamins there are certain fish oils which contain a substantially large proportion of unsaponifiables. In the concentration of such oils it is found that the unsaponifiables are fractionated, presumably in accordance with molecular weight, and are concentrated to a far lesser degree than are the vitamins in the overhead product. Apparently the vitamins are associated preferentially with the lower molecular weight unsaponifiables.

The refluxing of tower 3 by the oil phase precipitated in the rectification zone as a result of the heating of the propane phase to a higher temperature and the precipitation, reabsorption and reprecipitation which result from such refluxing make possible relatively sharp fractionation between those constituents of the oil with which the vitamins are associated from the remaining constituents of the oil. By these means it is possible to obtain a vitamin concentrate of high potency which represents a large proportion of the total vitamin content of the oil charge.

The stripping treatment effected in the lower portion of tower 3 at relatively low temperature reduces the vitamin content of the oil phase to the small degree permissible in the bottoms product and thus assists in the maximum recovery of the vitamin content of the oil in the overhead product.

While the process is illustrated as being carried out in a single tower it is evident that a series of concentrating towers may be employed in various relations. For example, a separate tower may be employed for the stripping zone, from which the propane phase passes to a separate rectification tower at the same or different operating conditions. Similarly the oil phase from the bottom of any tower may be subjected to additional treatment as the charge to a second concentrating tower. For example, the bottoms product in tower 3 may form the charge to a second concentrating tower similar in operation to tower 3 to produce a new overhead product having a vitamin potency which makes it suitable as a part of the charge to tower 3. Thus the maximum recovery of the vitamin content of the oil which is justified by economic considerations may be accomplished. Similarly the overhead product of tower 3 may be subjected to further concentrating treatment in a separate tower to produce a new overhead product of increased potency and a bottoms product of lower potency which may be suitable as charging stock for tower 3.

The propane phase is withdrawn from the top of tower 3 through line 26 for the recovery of solvent and oil therefrom and for such other further treatments as are desirable in the production of a vitamin concentrate. Line 26 connects with an evaporator 27 which is maintained at a substantially lower pressure than tower 3, a suitable valve being provided in line 26 for this purpose. As an example of the pressure differential between tower 3 and evaporator 27 reference may be had to an operating pressure of 600 pounds per square inch in tower 3 which is reduced to 300 pounds per square inch in evaporator 27. By this reduction in pressure and by the application of heat by means 28 or equivalent heating means in line 26 a substantial proportion of the propane content of the propane phase is vaporized. The vaporized propane passes overhead and is withdrawn from evaporator 27 through line 29.

The unvaporized material in evaporator 27 consisting of the remainder of the propane and the vitamin concentrate is withdrawn through line 30 which connects with the lower portion of a neutralizing tower 31. It may be desirable to pass all of the overhead product from tower 3 directly to neutralizing tower 31 without the removal of a part of the propane. For this purpose a by-pass line 32 is provided to connect line 26 with line 30. Line 30 is provided with cooling means 33 to precool the mixture passing therethrough to the temperature desired in the neutralizing tower 31. The vitamin concentrate oil from the bottom of evaporator 27 may be returned to the upper part of tower 3 through refluxing line 27a.

Neutralizing tower 31 is provided for the purpose of removing from the vitamin concentrate the free fatty acids which are concentrated in the overhead product along with the unsaponifiables and the vitamins. In order to effect such removal a sufficient quantity of alkali solution is admixed with the vitamin concentrate to neutralize the free fatty acids to form soaps which separate as a lower phase. The amount of alkali is limited, however, to the amount required to remove with the free fatty acids in order to avoid reaction of alkali with other, and less reactive, constituents of the concentrate. An alkali solution is introduced into the system through line 34 which is provided with a pump 35 and connects with line 30. Mixing of the alkali solution and the concentrate passing through line 30, as by means of a suitable mixer 36, is limited to the degree necessary to provide the necessary contact of the reagents with the formation of an emulsion of the oil and the soaps. The mixture of alkali solution and vitamin concentrate passes into the lower portion of tower 31 in which the neutralization reaction is completed and in which the soaps are separated from the vitamin concentrate.

Neutralizing tower 31 is divided into two parts by means of a trap-out tray 37 which permits the passage of liquids upwardly while preventing the passage of heavier liquids downwardly into the lower portion of tower 31. The upper portion of tower 31 above tray 37 is provided with suitable packing or other contact means.

Below tray 37 in tower 31 the vitamin concentrate solution in propane separates as an upper phase from the lower, or soap, phase. The upper phase, carrying a small amount of unseparated soaps, passes upwardly through tray 37. As the vitamin concentrate solution flows upwardly through tower 31 it is contacted with a downwardly flowing salt solution which is introduced into tower 31 at an intermediate point through line 38 provided with pump 39. The vitamin concentrate is thus scrubbed with the salt solution to facilitate the precipitation and separation of soaps which are entrained therein. Above the point of introduction of the salt solution the upwardly flowing stream of vitamin concentrate solution is scrubbed with a downwardly flowing stream of water to remove salt solution entrained in the concentrate solution. The water is introduced into the upper portion of tower 31 through line 40 provided with pump 41.

The water flows downwardly in tower 31 and merges with the salt solution. At tray 37 the salt solution and accompanying materials scrubbed from the vitamin concentrate solution are withdrawn through line 42 and are disposed of in a manner to be described below.

The vitamin concentrate solution is withdrawn overhead from tower 31 through line 43 which connects with an evaporator 44. Heating means 45 are provided in line 43 to heat the vitamin concentrate solution sufficiently to vaporize the propane contained therein. Separation of the propane vapors from the concentrate is effected in evaporator 44.

The propane vapors are withdrawn overhead from evaporator 44 through line 46 which connects with storage drum 5. Cooling means 47 are provided to liquefy the propane vapors passing through line 46. The propane withdrawn from evaporator 27 is recycled in this manner also, by the connection of line 29 with line 46.

The vitamin concentrate is withdrawn from evaporator 44 through line 48 which connects with a stripper 49. By means of valve 48a the pressure on the concentrate is reduced substantially to atmospheric pressure. In stripper 49 the concentrate is contacted with steam introduced from line 50 to effect substantially complete removal of propane from the concentrate. This stripping can be effected by the use of any inert gas which is permissible in the product, such as nitrogen and carbon dioxide, but the use of these gases hinders recovery of the propane thus removed. The steam and accompanying residual propane are withdrawn overhead through line 51. The vitamin concentrate, substantially free from propane and free fatty acids, is withdrawn from stripper 49 through line 52.

The oil phase which collects in the bottom of tower 3 is withdrawn and further treated for the recovery of propane therefrom. The oil phase is withdrawn through line 53 which connects with a stripper 54. Heating means 55 are provided to preheat the oil phase to the stripping temperature. Partial vaporization of the propane is thus effected and the propane thus vaporized separates immediately in the upper portion of stripper 54. The remaining liquid mixture of oil and residual propane is then subjected to the stripping action of steam introduced into the bottom of stripper 54 through line 56. The steam and propane pass overhead through line 57 which connects with a jet condenser 58. The oil is withdrawn from stripper 54 through line 59 for further handling as may be desired.

In jet condenser 58 the mixture of steam and propane is contacted with a spray of water, from line 60, which condenses the steam. Water is removed through line 61 and the propane passes overhead through line 62. Line 62 connects with a trap 63 which separates entrained water and the propane passes to a compressor 64 through line 65. At 64 the propane is recompressed to the pressure of drum 5. The outlet of compressor 64 is connected to line 46 through line 66.

A vacuum may be applied to stripper 49 to assist in the removal of residual propane from the vitamin concentrate. For this purpose line 51 may be connected to a steam vacuum pump 80. The mixture of propane and steam thus produced is transferred through lines 81 and 57 to jet condenser 58 for recovery in the propane.

The salt solution and accompanying materials withdrawn from tray 37 through line 42 may be disposed of in any convenient manner but preferably it is introduced into condenser 58 to recover propane dissolved therein. For this purpose line 42 is connected to line 57.

The soaps separated as the lower phase in the bottom of tower 31 may be disposed of in any suitable manner. Advantageously, however, these soaps are treated to recover free fatty acids therefrom. For this purpose the soaps are withdrawn from the bottom of tower 31 through line 67. A sufficient quantity of acid, such as sulphuric acid, is introduced into line 67 through line 68 provided with a pump 69. The resulting mixture, after passage through a suitable mixing device 70, flows into settler 71 to which line 67 is connected. In settler 71 the fatty acids formed by reaction of acid with the soaps separate as an upper phase while the acid solution separates as a lower phase. The lower phase material is disposed of conveniently by passage thereof to condenser 58. For this purpose it is withdrawn through line 72 which is provided with a pump 73 and connects with line 42.

The fatty acids are withdrawn from the upper portion of settler 71 through line 74 which connects with the upper portion of a stripper 75 for the recovery of propane from the fatty acids. Heating means 76 are provided to heat the fatty acids to the stripping temperature. The separation of propane from the free fatty acids is promoted by steam which is introduced into the bottom of stripper 75. The resulting mixture of propane and steam is withdrawn through line 77 which connects advantageously with line 42 to permit recovery of the propane in the manner described above. The fatty acids are removed as a part of the process through line 78, which is provided with a cooler 79.

The vitamin product obtained at 52 may be employed as such as a vitamin concentrate but it may be desirable to subject it to further treatment to remove relatively high melting compounds, such as stearin therefrom. This treatment is carried out conveniently by dissolving the concentrate in a hydrocarbon solvent and cooling the solution sufficiently to crystallize the stearin which is then separated by filtration. Any suitable hydrocarbon solvent, such as propane or pentane, may be employed.

The method of operation illustrated by Fig. 1 involves the separation of a single vitamin concentrate product as an overhead product which may then be passed directly to the neutralizing tower. The invention is not limited, however, to the specific operation thus illustrated but includes as well operations in which a plurality of different products are withdrawn from the tower by the withdrawal of one or more side streams from the tower at intermediate points thereof. In addition the overhead product of the tower may be subjected to further handling in a manner different from that illustrated in Fig. 1. These modifications of the operation shown in Fig. 1 are illustrated in Figs. 2 and 3 of the drawings.

In Fig. 2 the overhead product of tower 3a, passing through line 26a, may be diverted entirely or in part through line 82 which passes through heating means 83 and connects with a separator 84. At 83 the propane solution is heated to a temperature higher than the maximum temperature in tower 3a to effect the precipitation of a portion of the oil which is dissolved in the propane. The oil phase thus formed separates as a lower phase in separator 84. The upper, or propane, phase in separator 84 is withdrawn overhead through line 85. This material may be substantially denuded of oil by the heating operation at 83 or may still contain a substantial proportion of the dissolved oil with which may be associated a substantial proportion of the vitamin content of the overhead product of tower 3a. The material passing through line 85 may, therefore, be separately treated for the recovery of propane and oil or may be returned to line 26a for treatment in the manner illustrated by Fig. 1.

The oil phase separated in separator 84 is withdrawn through line 86. Depending upon the character of the oil being treated, this material may constitute the principal vitamin concentrate product of the process or may constitute a by-product of lesser potency.

Fig. 2 also illustrates one method for withdrawing a product from tower 3a as a side stream. A partition plate 87 is provided in tower 3a, preferably at a point somewhat above the point of introduction of the vitamin oil charge through line 1a. The oil which precipitates from the propane stream passing uwpardly in the tower above partition plate 87 is permitted to collect thereon and maintain a desired level of the oil at that point, the rate of flow of oil downwardly through the partition plate 87 being controlled by valve 88 which is regulated to maintain the desired level of oil above partition plate 87. The upwardly rising stream of propane is withdrawn from tower 3a, at a point just below partition plate 87, through line 89 provided with pump 90. Line 89 connects with side stream fractionator 91 which is provided with heating coils 92. Heating coils 92 heat the propane stream passing through fractionator 91 preferably with a temperature gradient to effect precipitation of a portion of the oil component of the propane stream, the oil separating as a lower phase in the bed of fractionator 91 and being withdrawn through line 93.

The propane stream passes out of the top of fractionator 91 and into tower 3a just above the level of the oil supported on partition plate 87. The propane stream then passes upwardly through the remaining portion of tower 3a in which it is subjected to rectification in the manner described above.

The oil withdrawn through line 93 from fractionator 91 constitutes a vitamin-rich material which may be treated further in the manner illustrated in Fig. 1 for the treatment of the overhead product of tower 3a. The oil withdrawn through line 93 may constitute the principal vitamin concentrate product of the process, or an overhead product withdrawn through line 26a may be the source of the principal vitamin product. In the latter case the oil withdrawn at 93 may be treated to separate therefrom a vitamin concentrate of relatively low potency suitable for certain uses.

Fig. 3 illustrates a different method of refluxing the rectification zone of the tower whereby rectification is obtained regardless of the presence or absence of a temperature gradient in the concentrating tower. In accordance with this modification the solvent power of the propane phase for the less soluble constituents of the oil is lessened during its passage through the rectification zone to produce continuous precipitation, reabsorption and reprecipitation of the oil. The solvent power of the propane phase for less soluble constituents of the oil is lessened by introducing into the rectification zone a portion of the vitamin oil which is more soluble in the propane phase than some of the oil which is already dissolved in the propane phase at or near the point of introduction. The oil which is preferentially soluble in the propane phase may be introduced directly into the rectification zone at the point at which it is desired to change the propane phase or the oil may be introduced into the rectification zone at a point at which the propane phase is substantially saturated with respect to that oil whereby the latter flows downwardly to a point in the rectification zone at which it is more soluble in the propane stream. This method of operation may be combined with the operation in which the tower is refluxed by means of a temperature gradient.

Fig. 3 also illustrates a different method for withdrawing a side stream product.

In Figure 3 heaters 6b and 9b are provided in the lines to the solvent and charge oil inlets respectively. Heaters 6b and 9b serve to maintain better temperature control by heating the liquids before their entry into tower 3b; or, in some cases, a satisfactory temperature gradient in tower 3b can be established by heating liquid introduced at various elevations. This method of heating may be used in conjunction with heaters within the tower such as 16b, or, such heaters may be eliminated entirely. A portion of the propane phase passing through line 26b is diverted through line 94 which is provided with heating means 95 and connects with a separating vessel 96. A valve 97 is provided in line 94 to permit reducing the pressure on the propane phase to cause substantial vaporization of propane which is separated in vessel 96. The pressure may be reduced at valve 97 whereby all or substantially all of the propane is caused to evaporate and thus separate from the oil component. This effect may be assisted by heating at 95 and by heating means, not shown, in vessel 96. Alternatively vessel 96 may be maintained substantially at the pressure of tower 3b and evaporation of the propane effected entirely by the application of heat. The propane which is thus separated is withdrawn overhead from vessel 96 through line 98. While substantially all the propane may be evaporated in vessel 96 to leave a liquid phase consisting substantially entirely of oil it is more convenient ordinarily to effect only a partial evaporation of the propane whereby some propane is left in the liquid phase. The propane withdrawn from line 98 is recovered for use, for example, by being condensed and returned to a reservoir such as storage drum 5 in Fig. 1.

When the operation in this manner is stabilized a part of the oil product passing overhead from tower 3b through line 26b is withdrawn for further treatment in the general manner illustrated in connection with Fig. 1. This product portion of the overhead may be withdrawn continuously through the valve in line 26b, in the form of the propane phase, or all the overhead product may be passed to vessel 96 from which a portion of the liquid phase may be passed, by means not shown, to the further steps for treating the vitamin concentrate.

The liquid phase collected in vessel 96, which may contain propane, is withdrawn through line 99 which is provided with pump 100 and cooler 101. Part of the extract oil accumulated in vessel 96 may be withdrawn through line 99a as product. Under stabilized conditions of operation that portion of the liquid in vessel 96 which is not to be withdrawn as product is passed continuously through line 99 to the upper portion of tower 3b at the temperature desired at that point of tower 3b.

It may be desirable to effect complete refluxing of tower 3b at the beginning of the operation by returning all of the overhead product as refluxed through line 99 to hasten the operation of bringing tower 3b to equilibrium conditions of operation. This condition is represented by the presence of the desired vitamin or vitamins in the desired concentration in the oil component of the propane phase withdrawn through line 26b, under conditions which effect satisfactory recovery of the vitamin content of the charge oil in that overhead product. Then withdrawal of a portion of the overhead product through the valve in line 26b or, by means not shown, from vessel 96 may be initiated. After the equilibrium condition of operation is reached and a quantity of reflux material is accumulated in vessel 96 the amount of vitamin concentrate withdrawn from the system will be in proportion to the fresh oil feed and the reflux ratio, which is the ratio of the quantity of oil returned to tower 3b through line 99 to the quantity of oil withdrawn as product, is then controlled to regulate or vary the conditions in the rectification zone.

The reflux liquid which is introduced into tower 3b through line 99 is more concentrated in oil than is the propane phase at the point of introduction of the reflux liquid. Since the propane phase at that point, or at a slightly lower point in the tower, is substantially saturated with oil the introduction of the reflux liquid causes a redistribution of oil at that point. The more soluble portions of the reflux oil are dissolved in the propane phase and there is a corresponding precipitation of less soluble portions of the oil from the propane phase. The precipitated oil and the undissolved portion of the reflux oil form a second liquid phase which then flows down the tower in counter-current contact with the upwardly flowing propane phase. As this oil phase flows downwardly in the rectification zone there is a continuous redistribution of oil between the propane phase and the oil phase. At each point in the rectification zone the most soluble portions of the oil phase are dissolved in the propane phase with a corresponding precipitation of the less soluble portions of the oil in the propane phase. As the oil phase passes down the rectification zone it becomes more concentrated in the less soluble portions of the oil and the oil phase thus gradually assumes the character of the oil phase in the stripping zone in respect to the ratio of propane to oil therein. At the oil charge point the oil phase which flows downwardly into the stripping zone from the rectification zone merges with the oil charge and forms a part of that phase.

It will be seen that the initial introduction of the reflux oil effects an immediate improvement in the propane phase passing overhead through line 26b in respect to its concentration of more soluble, vitamin containing, portion of the oil. This in turn produces reflux oil which is more concentrated in the more soluble portion of the oil. The improved reflux oil then produces a still greater improvement in the propane phase by increasing the concentration of the more soluble portions of the oil at the reflux point. Furthermore, the quantity of oil in the tower at that point is continuously increased since no overhead product is withdrawn from the system. Consequently the quantity of oil in the heavier phase in the rectification zone is increased with a resulting increase in the degree of rectification of the oil in the rectification zone.

Complete refluxing of the overhead product is continued in this manner until the concentration of the desired constituents of the oil in the oil portion of the propane phase flowing through line 26b is reached. Thereafter, a portion of the overhead product is withdrawn. However, the proportion of the oil from the propane phase in line 26b which is refluxed to the tower in line 99 is maintained sufficiently large to maintain the desired composition of the oil portion of the propane phase in line 26b. Necessarily this proportion depends upon the degree of concentration of the vitamin oil desired, the character of the oil, the character of the solvent, the tower temperature, and the ratio of the solvent to oil which is employed.

During the time in which tower 3b is operated with complete refluxing of the overhead product, in order to reach equilibrium conditions, adjustments of the tower temperature or the ratio of propane to oil may be made. The process is initiated preferably by filling tower 3b with liquid propane and introducing propane and oil at the desired rates. Initially, therefore, the ratio of propane to oil in the tower is very high so that a great part, if not all, of the oil is dissolved in the propane phase which moves upwardly in the tower and overhead through line 26b.

In order to initiate fractionation of the oil in approximately the desired proportions it may be desirable to start the operation of tower 3b at a substantially higher temperature than is contemplated for the equilibrium conditions. Heating means are provided to permit control of the temperature at which propane and the oil are introduced into tower 3b. By maintaining the temperature of the tower at a point nearer the critical temperature of the solvent, in the range of temperatures between the critical temperature and approximately 100° F. below the critical temperature of the propane, the solubility of the oil in the propane is substantially decreased. This counteracts the tendency of the oil to dissolve in large proportions in the propane as a result of the initial high ratio of propane to oil in the tower. As the oil accumulates in the tower as a result of continued complete refluxing through line 99 the ratio of propane to oil in the tower decreases as a result of the displacement of propane by oil and the propane becomes more saturated with respect to the oil. Consequently it is necessary to lower the tower temperature as the reflux oil accumulates in the tower in order to permit continued solution of fresh oil in the propane phase and to prevent the inclusion of an undesirably large proportion of the vitamin content of the oil in the oil phase which is withdrawn from the bottom of tower 3b.

Instead of, or in addition to, the adjustment of the temperature of tower 3b the ratio in which propane and oil are charged to the tower may be adjusted during the time the tower is brought to equilibrium conditions of operation. For example, the ratio of propane to oil charged to the tower may be quite low at the beginning of the operation and may be increased to the final desired figure as the soluble portion of the oil accumulates in the propane phase in the tower.

Alternatively the operation may be initiated with tower 3b at the temperature desired for the equilibrium conditions of operation by charging the propane and oil to the tower at the ratio to be used under equilibrium conditions. If the oil is predominantly or completely soluble in the propane phase initially a large part, or all, of the oil is thus taken overhead through line 26b. This oil, however, is continuously separated from propane at 96 and refluxed to the tower through line 99. Consequently the concentration of oil in the top of tower 3b eventually reaches the point of saturation after which time the refluxed oil is not completely redissolved and a portion of the oil in the propane phase is precipitated, thus forming the desired lower phase. While this lower phase may be redissolved as it proceeds down the tower the quantity of the oil in the lower phase continuously increases, and the amount of oil in solution in the propane stream in the lower part of the tower increases, to the point at which the proportion of the oil charged to the tower which dissolves in the propane phase at or near the oil charge point is substantially reduced. In this manner relatively high molecular constituents of the oil which were initially dissolved in the propane phase and are refluxed to the tower through line 99 eventually are completely rejected by the propane phase and form the lower, or oil, phase which accumulates in the bottom of tower 3b. However, it may take a longer time to reach equilibrium conditions by this method than by the methods involving adjustments of temperatures and propane-oil ratios.

The methods for bringing tower 3b to equilibrium conditions of operation which are described above involve complete refluxing of the overhead product during the period in which the tower is brought to equilibrium conditions. However, if the operating conditions, such as tower temperature and propane-oil ratio, are adjusted at the beginning of the operation to produce an acceptable overhead product the withdrawal of a part of this product may be initiated immediately and the amount thus withdrawn may be increased as the quantity of the reflux liquid in the system is increased during the time in which the tower is brought to equilibrium conditions of operation.

The operating temperature preferably is maintained within the temperature range from the critical temperature of propane to about 100° F. below the critical temperature. In this range the liquid density of the propane is substantially lower than at lower temperatures whereby it is more selective as a solvent. If it is necessary to recover the propane concentrate as an extract, as it is in the case of vitamins A and D, it is desirable to operate at a relatively high temperature within the range mentioned. Conversely, if it is necessary to recover the vitamin concentrate as a lower phase product it may be desirable to operate at a lower temperature in order to carry overhead a larger part of the oil.

As is pointed out above, the temperature to be employed under equilibrium conditions of operation may be so low as to effect substantially complete solubility of the oil in the propane in the ratio at which these are to be charged to the tower. However, as is described above the accumulation of refluxed oil in the tower lowers the solubility of the oil charge in the propane phase to the point at which the latter has the desired selectivity as a solvent. With propane the temperatures which may be employed fall within the range of approximately 110° F. to approximately 210° F. When treating fish oils to concentrate vitamins A and D the relatively high temperatures in this range are employed, for example 150 to 175° F. Necessarily when employing solvents other than propane the preferred temperatures depend upon the critical temperature of such other solvent.

The ratio of propane to oil ordinarily should be at least 20:1 and substantially higher ratios are desirable in effecting high concentrations of the vitamin content in the oil. For example, ratios of 30:1 to 100:1 or higher may be employed.

The tower is maintained under pressure sufficiently high to insure the maintenance of liquid phase conditions in the tower during the operation. Ordinarily a pressure which is about 50 pounds per square inch higher than the vapor pressure of the solvent at the highest contemplated temperature is satisfactory.

The foregoing description of tower 3b relates particularly to an operation in which the vitamin product is recovered as an overhead extract in the propane phase. This is normally the method employed in concentrating vitamins A and D in fatty oils. However, the process is applicable also to operations in which the vitamin product is recovered in the lower phase. Under such conditions refluxing of the tower through line 99 is continued until the proportion of the vitaminous material in the oil content of the propane phase passing through line 26b is reduced to the permissible figure. Thereafter, the withdrawal overhead of residual oil may be initiated.

The refluxing of the tower through line 99 provides a method for maintaining control of the operation of the tower in producing concentrates of constant potency. By varying the rate at which oil is refluxed through line 99 the variations in the potency of the concentrate which would normally occur as a result of the variations in the potency of the oil charge, variations in the ratios of propane to oil and variations in the pressure and temperature conditions of the tower can be promptly counteracted by suitable adjustment of the refluxing rate. For example, if the variations mentioned bring about a decrease in the potency of the concentrate taken overhead this can be corrected promptly by increasing the reflux ratio to the amount necessary to increase the potency to the required figure.

The reflux ratio varies from infinity at the beginning of the operation to a final ratio, necessary at equilibrium conditions, which may be in the range of 0.5:1 to 10:1. While the reflux ratio depends somewhat upon the character of the oil and the ratio of solvent to oil employed it is found that the necessary reflux ratio is governed principally by the degree of concentration desired. For example, if it is desired to recover a product having a potency 10 times that of the original oil, a higher reflux ratio is necessary than would be employed in producing under the same conditions a product having a potency only 5 times that of the original oil. The rectification and extraction zones in tower 3b are operated in accordance with this modification of the invention at a constant temperature which is controlled by suitable control of the temperature of the oil and propane which are charged into the tower.

While the two methods of rectifying the concentrating tower have been described separately and may be employed separately it will be understood that these methods may be combined in a single operation. For example, a temperature gradient may be maintained in tower 3b in the manner described in connection with tower 3, by means of the steam coils shown, while at the same time refluxing tower 3b through line 99. Such combined operation may be desirable as providing closer control of the operation of the concentrating tower.

The oil which is precipitated in the upper portion of tower 3b may be collected on a suitable trap-out tray 102 which is located preferably above the point of introduction of the vitamin charge through line 3b. The trap-out tray 102 permits the passage upwardly therethrough of the propane stream but collects the downwardly flowing oil phase which may be withdrawn through line 103 provided with pump 104.

The oil phase thus withdrawn through line 103 may constitute the principal vitamin concentrate product of the process or, depending upon the character of the charge and the conditions of operation, may constitute a by-product of relatively low vitamin potency. This material may be subjected to further treatment for the purification thereof in the manner shown for the treatment of the overhead product in Fig. 1 or may be further treated for the recovery of propane thereof in the manner shown for the treatment of the bottom product of tower 3 in Fig. 1. Preferably, however, all or a portion of this material is passed through line 105 to a separate stripping or fractionating tower 106. In tower 106 the oil introduced through line 105 flows downwardly in counter-current contact with a stream of propane introduced through line 107 into the lower part of fractionator 106. If desired, heating means 108 may be provided in the upper portion of fractionator 106 to provide a temperature gradient, the propane being introduced through line 107 at the temperature desired in the bottom of fractionator 106. The bottom product stripped of lower-boiling ingredients is withdrawn through line 109. This material may be subjected to further treatment in the manner suggested for the treatment of the material withdrawn through line 103. The propane stream passes out the top of fractionator 106 through line 110 which connects with tower 3b just above trap-out tray 102. This propane stream combines with the propane stream moving upwardly in tower 3b, and the combined stream is subjected to further treatment in the manner described.

In the separation of fat-soluble vitamins, such as vitamins A and D, it is apparent that it is necessary to separate from the oil a relatively small proportion of the oil as the overhead concentrate. For example, in concentrating vitamins A and D in fish oils it may be desirable to effect a ten-fold concentration. This requires including in the propane phase no more than about 10% of the oil charge. Excluding all but this small proportion of the oil from the propane requires maintaining the latter at a maximum temperature in the range of temperatures in which small changes of temperature produce great changes in the miscibility of the propane with the oil. For example, in an operation in which 7% of the oil is included in the propane phase, to produce a ten-fold concentration at an efficiency of 70%, a decrease of 1° F. in the top temperature may increase the proportion of the oil included in the propane phase to about 10% with a loss of 20% in the vitamin concentration. As it is difficult to control the temperature within 1° F., particularly in a continuous operation, it is evident that this represents an important problem in operation. This problem may be overcome by adjusting the temperature conditions to produce approximately the separation of the oil which is required and then maintaining the degree of concentration exactly at the required point by adjusting the pressure on the tower. Substantial changes in pressure produce relatively small changes in the miscibility of the oil with the solvent. Consequently the miscibility of the oil and the solvent and the degree of concentration can be controlled more efficiently in this manner. Automatic control means may be provided responsive to variations to potency in the product or the quantity thereof to adjust the pressure on the tower as required.

It is an advantage of the new process that substantial saponification of the oil before, during or after final concentration is avoided. The use of saponification to a certain degree, however, is not excluded in connection with this invention. For example, a preliminary mild saponification, or neutralization, may be employed to remove free fatty acids from the oil feed. Preferably, however, the use of alkali is limited to a neutralization of the vitamin concentrate to saponify fatty acids under conditions avoiding emulsification.

A preferred method of operating the fractionation zone to accomplish vitamin concentration is best described by means of a mathematical formula in which all of the variables which control the fractionation zone play a part. The principal operating variables which may be manipulated in the fractionation zone are the following:

P=volumetric solvent-oil ratio=volume of solvent charged to zone per unit of time divided by volume of charge oil charged to zone in unit of time. (Volumes calculated at 60° F.)

G=temperature gradient=temperature near extract phase outlet of zone minus temperature near raffinate phase outlet of zone.

R=reflux ratio=volume of vitamin concentrate oil introduced through reflux inlet per unit of time divided by the volume of charge oil introduced into zone per unit of time.

T=departure from critical temperature=critical temperature of the extract phase near the extract phase outlet minus actual temperature of extract phase near extract phase outlet.

V=recovery=percent of vitamins in charge oil which are recovered in extract phase.

C=concentration factor=concentration of vitamins in extract oil (contained in an extract phase at extract phase outlet of fractionation zone) divided by concentration of vitamins in charge oil.

E=performance factor=

$$\frac{C}{100-V}$$

Note: E is a measure of what degree of performance is demanded of a particular operation. Naturally, the maximum performance factor is not always desirable because it may be expensive to obtain it. A balance must be established in each case for the maximum performance factor which is economically feasible.

A=fatty acid content of extract=percent of free fatty acids in extract oil contained in an extract phase near the extract phase outlet of a fractionation zone.

F=operation factor=$(PT)^{\frac{1}{2}}(G+3R)$

Note: Operation factor is a function which increases with various operating variables which tend to increase vitamin concentration. Seemingly, the higher the operation factor the better; but this is not actually the case since too high a value for any one of the operating variables or for the operation factor gives rise to fractionation zone conditions which result in either less recovery or less concentration.

B=percent of vitamins charged but not in extract phase=100−V.

For the best concentration results it has been found that the following formula applies generally:

$$F-850E-40A=0$$

Actually, the formula cannot be applied with absolute mathematical precision and it is nearer to the facts of operation when used to select a range within which the operating variables must be related in order to give certain performance. Allowing for this range the above formula becomes $$F-850E-40=\pm 750$$

When rectification is to be established without any refluxing the above formula may be written $$P^{\frac{1}{2}}T^{\frac{1}{2}}G-\frac{850C}{100-V}-40A=\pm 750$$

When rectification is accomplished without any temperature gradient within the fractionation zone the formula becomes $$3P^{\frac{1}{2}}T^{\frac{1}{2}}R-\frac{850C}{100-V}-40A=\pm 750$$

The above formulas are subject to certain qualifications that must be applied in the light of physical limitations encountered in operating the process. One of the principal limitations is that once the concentration factor C has been selected, the value of T is established within relatively narrow limits. For examples, if a concentration of 10 is desired in a particular operation, then the percentage of charge oil which must be taken into the extract phase is 10% or less. If recovery were 100% then a 10% overhead would produce a 10:1 concentrate, but since some vitamins are lost (i. e. V is always less than 100) it is necessary to take only 8 or 9 per cent, or some such figure, overhead in order to achieve a concentration factor of 10. In order to fractionate a particular oil into, say an 8% extract fraction, and a 92% raffinate fraction, it is necessary that a certain temperature in the paracritical range be used, other operating variables being constant. Furthermore, although the temperature at the top of the fractionation zone may be increased a little if the propane ratio or the reflux ratio is increased, the total range of acceptable temperatures to achieve a 9% overhead is only a few degrees regardless of the other variables. It is convenient therefor to establish first what tower temperatures will be approximately satisfactory in order to achieve the fractionation. These may be determined for any particular oil by experimental procedures well known in the art of solvent fractionation in the paracritical range.

Secondly, the percent of fatty acids in the overhead is not an operating variable. The fatty acid content is different for each oil. In addition the percentage of the fatty acid content of the charge oil which will be found in the extract phase will depend upon the percent of oil taken overhead (i. e. upon the concentration factor C).

For any given case, P, G, and R are the real variables which may be manipulated.

The most convenient way of using the formula is to employ a graphical system of the run-on type as shown in Fig. 4. As previously stated, it is desirable that $F-850E-40A=0$ or, if there be a remainder other than zero on the right hand side of this equation, that it be within the range ±750. In the graphical illustration this remainder will be designated as Q.

Although the graph may be used in several different ways, the most convenient way is to begin by selecting a concentration factor C which seems to be within the range of possibility and economically feasible for a particular oil. The selection of concentration factor C will indicate very nearly the value of T; in Figure 4 the various values of T are indicated by the various sloping lines in the lower right hand quadrant; having selected C, we know which one of these lines must be dealt with in the example. The next selection to be made is the percent recovery to be expected; if no experience has been accumulated for the particular oil, then V must be selected by guess for the first time. Performance factor E can then be calculated. A trial run will now determine the value of A; naturally, this value will vary slightly depending upon G, R, and P, but these variations may be ignored, at least in the first application of the formula for trial runs.

A vertical line should now be drawn in the upper left hand quadrant of Fig. 4 so as to intercept the proper A curve at a point directly above the calculated value of E. At the point of intersection between this vertical line and the appropriate A curve a horizontal line should be drawn extending all the way across Fig. 4, through the Q curves in the upper right hand quadrant. Next, the values of G, R, and P may be selected. The value of G+3R is calculated and a vertical line is drawn on the graph of the lower left hand quadrant of Fig. 4 so that the selected P curve is intercepted by an ordinate line through the calculated value of G+3R. The point at which this ordinate vertical line intersects the proper P curve will determine the elevation of a horizontal line to be drawn across to the family of T curves in the lower right hand quadrant. The point at which this horizontal line intersects the previously selected T curve will determine the location of a vertical line to be drawn upwardly to intersect with the horizontal line of the upper left and right hand quadrants. An example may be given as follows: Assume that a concentration of 10 is desired and that it is known that the value of T and V must be approximately 10° F. and 92% respectively. Then the value of $$E = \frac{C}{100-V} = 1.25$$

If there are 5% fatty acids in the overhead then a point 120 will be determined by the intersection of vertical line 121 with estimated location of an A curve of value 5. Upper horizontal line 122 may now be drawn. For trial purposes the value G=10 and R=1 may be selected, giving a value for G+3R of 13. If the propane ratio of 50 is now selected for trial a vertical line 123 may be drawn in the left hand quadrant so as to intersect the P=50 curve at 124. A horizontal line 125 drawn through point 124 will intersect T=10 line at point 126. At vertical line 127 may now be drawn and will be found to intersect line 122 at point 128. Examination of Fig. 4 shows that a rather poor choice has been made. Operating conditions fall on the very edge of the satisfactory band of operation for the performance desired. It is very possible that a trial will now prove the need of increasing G+3R to, say 30.

It should be pointed out that this equation has been prepared on the basis of experiments with propane and that it is less reliable with other solvents to the extent that their critical temperature departs from that of propane.

Another qualification is that there are some factors, such as the physical properties of the fractionation zone which have been ignored because they do not profoundly affect the process. However, experimentation will reveal that for a particular tower some other Q curve than zero will be the Q of maximum desirability.

The attached chart is a record of a number of runs of four different kinds of oil which were processed in accordance with the method disclosed herein.

| Charge Oil | Run No. | P | G | 3R | T | C | 100-V | A |
|---|---|---|---|---|---|---|---|---|
| Mexican Salted Shark Liver Oil. | LA—684 | 97.1 | 5 | 5.3 | 30 | 11.6 | 15.1 | 0.17 |
| | 605 | 89.2 | 0 | 5.5 | 38 | 3.8 | 17.2 | 0.80 |
| | 562 | 101 | 20 | 0 | 13 | 5.3 | 8.4 | |
| | 560 | 96.4 | 13 | 0 | 21 | 4.1 | 21.2 | |
| Soupfin Shark Liver Oil.. | 828 | 99.1 | 6 | 4.4 | 17 | 5.4 | 6.2 | 0.66 |
| | 829 | 49.1 | 9 | 2.5 | 24 | 5.3 | 10.1 | 0.35 |
| | 830 | 50.0 | 9 | 2.8 | 31 | 5.1 | 59.7 | 0.08 |
| | 561 | 97.0 | 21 | 0 | 15 | 6.9 | 3.8 | |
| | 532-1 | 73.7 | 19 | 0 | 15 | 4.3 | 20.1 | 3.4 |
| | 532-2 | 75.7 | 14 | 0 | 17 | 4.0 | 22.0 | 3.36 |
| | 444 | 15 | 27 | 0 | 26 | 5.6 | | |
| | 452 | 16.7 | 0 | 0 | 63 | 1.5 | | |
| | 453 | 25.2 | 24 | 0 | 31 | 6.4 | | |
| Grayfish Liver Oil......... | 833 | 52.0 | 9 | 4.7 | 26 | 10.6 | 65.1 | 3.72 |
| | 739 | 93.1 | 3 | 4.9 | 26 | 10.5 | 13.6 | 0.15 |
| | 740 | 48.7 | 5 | 4.2 | 31 | 9.2 | 23.7 | 0.026 |
| | 567 | 99.7 | 9 | 0 | 25 | 2.8 | 7.2 | |
| | 568 | 98.1 | 12 | 0 | 18 | 6.6 | 35.0 | |
| Cod Liver Oil ........... | J—1854 | 47.2 | 8 | 6.0 | 40 | 18.3 | 23 | 14.9 |
| | 1861-1 | 51.4 | 10 | 6.0 | 40 | 18.1 | 24 | 0.86 |
| | 1861-2 | 88.2 | 14 | 6.0 | 35 | 20.8 | 17 | 1.35 |
| | LA—617-1 | 51.1 | 0 | 5.6 | 46 | 3.9 | 54.5 | 4.69 |
| | 617-2 | 51.0 | 0 | 7.5 | 47 | 5.7 | 27.3 | 5.33 |
| | 617-3 | 50.7 | 1 | 8.7 | 46 | 7.2 | 19.6 | 6.72 |
| | 618 | 97 | 0 | 7.2 | 26 | 11.9 | 25.1 | 0.79 |
| | 666 | 48.2 | 1 | 4.2 | 50 | 4.2 | 11.3 | 0.024 |
| | 667 | 96.4 | 1 | 6.8 | 46 | 4.5 | 7.0 | 0.05 |
| | 668 | 100.9 | 1 | 9.7 | 32 | 9.9 | 21.2 | 0.31 |
| | 831 | 48.4 | 7 | 4.1 | 38 | 3.8 | 6.1 | 0.02 |
| | 832 | 96.4 | 10 | 1.2 | 24 | 6.1 | 25.4 | 0.75 |

The invention is further described in connection with the following examples which involve the treatment of specific oils to concentrate the vitamin A or vitamin D contained therein. It will be noted that in certain of the examples both vitamins A and D were present in the oil treated. In such examples, however, the concentration of vitamin A was incidental to the concentration of vitamin D. In the following examples all illustrations of vitamin A potencies were made by the spectrophotometric method at a wave length of 328 millimicrons unless otherwise designated.

*Example I*

A shark liver oil having a vitamin A potency of 43,200 international units per gram, was subjected to concentration treatment by rectification and absorption in a tower in which the ratio of height to diameter above the propane charge point was 96:1. The oil was charged to the tower, at the rate of 637 cc. per hour per sq. in. of tower area, at a point ⅝ the height of the tower above the propane charge point and was contacted by an upwardly-rising propane stream in a ratio of 15 volumes of propane to 1 volume of oil. The tower was maintained at temperatures of 194° F. at the top and 167° F. at the bottom and 177° F. at the point of introduction of the oil. This represents, therefore, a temperature gradient of 10 degrees in the lower, or stripping, section of the tower and a temperature gradient of 17 degrees in the upper, or rectification, portion of the tower. Under these conditions 7.8 weight per cent of the oil was taken overhead as the concentrate, and 92.2 weight per cent of the oil was withdrawn from the bottom of the tower in the manner described above in connection with the operation of tower 3. The overhead product exhibited a vitamin A potency of 240,000 I. U./gram while that of the bottoms product was 28,200. The overhead product represented therefore a concentration of 5.55 and 43.3 per cent of the vitamin A content of the charge.

*Example II*

The bottoms product of Example I was subjected to a stripping treatment with propane in the tower at a uniform temperature of 157° F. at a ratio of propane to oil of 16.7:1, the oil feed being introduced, at the rate of 460 cc. per hour per sq. in., at a point ¾ the height of the tower above the propane charge point to promote the stripping effect. By this means an overhead product was obtained which had a vitamin A potency of 42,000 I. U./gram. This operation represents substantially an extension of the operation of Example I in that the bottoms product of Example I was subjected to the additional stripping action which would have been afforded by the use in Example I of a higher tower with a longer stripping section. The overhead product obtained by this stripping treatment of the bottoms of Example I was then combined with the overhead product of Example I to form a composite feed having a vitamin A potency of 72,200 I. U./gram. This material was then charged to the tower at a rate of 316 cc. per hour per sq. in. at a point ⅜ the height of the tower above the propane charge point. Propane was charged at a ratio of propane to oil feed of 25.2:1. In this operation the tower was maintained at temperatures of 189° F. at the top, 165° F. at the bottom and 165° F. at the point of introduction of the oil feed. In this operation, therefore, the stripping section of the tower was maintained at a constant temperature, and a temperature gradient of 24 degrees was maintained in the rectification zone. These operating conditions produced an overhead product representing 9.3 weight per cent of the charge and a bottoms product representing 90.7 weight per cent of the charge. The overhead product exhibited a vitamin A potency of 460,000 I. U./gram, while the bottoms product exhibited a potency of 21,800 I. U./gram. The potency of the overhead product was verified by a biological test, after neutralization, by the method set forth in U. S. Pharmacopoeia XI, which indicated a value between 425,000 and 475,000 I. U./gram. This product exhibited unusual stability in accelerated oxidation tests and gave no evidence of toxicity in biological tests on rats at a feeding rate of 500 units per day.

*Example III*

A shark liver oil having a vitamin A potency of 44,200 I. U./gram was subjected to concentration treatment by rectification and absorption, in the same treating tower employed in Examples I and II, under conditions selected to produce an overhead product having a potency approximately twice that of the charge oil and representing a relatively high recovery of the vitamin A content of the oil. The oil was charged to the tower at the rate of 637 cc. per hour per sq. in. at a point ⅗ the height of the tower above the propane charge point and was contacted by the upwardly rising propane stream in a ratio of 25 volumes of propane to 1 volume of oil. The tower was maintained at temperatures of 176° F. at the top, 165° F. at the bottom, and 165° F. at the point of introduction of the oil. It is to be noted that the top temperature employed in this operation was lower than the top temperature of the operations of Examples I and II in order to pass overhead a larger proportion of the oil feed. In this operation also the rectification portion of the tower was maintained at a temperature gradient of 19° F. while the stripping section was maintained at a constant temperature. These operating conditions produced an overhead product constituting 42.2 weight per cent of the oil feed and having a vitamin A potency of 86,000 I. U./gram. The product contained 82 per cent of the vitamin A content of the oil feed. In this operation the concentration of the vitamin A was accompanied by a corresponding concentration of the unsaponifiable constituents of the oil feed and of the free fatty acid content thereof since the concentration of each of these in the overhead product was approximately double the corresponding concentration of the oil feed.

*Example IV*

A dogfish liver oil having a vitamin A potency of 9800 I. U./gram was subjected to concentration treatment by rectification and absorption in the same tower under conditions selected to produce a concentrate having a potency four times that of the charge oil and representing a substantial recovery of the vitamin A content of the oil. In this operation the oil was charged to the tower, at a rate of 317 cc. per hour per sq. in., at a point ⅗ the height of the tower above the propane charge point and was contacted with the upwardly flowing stream of propane at a ratio of propane to oil feed of 49.5:1. In this operation the tower was maintained at temperatures of 201° F. at the top, 176° F. at the feed point and 170° F. at the bottom. The rectification zone of the tower was maintained, therefore, at a temperature gradient of 25° F. while a temperature gradient of 6° F. was employed in the stripping section of the tower. These operating conditions produced an overhead product representing 19.5 weight per cent of the oil feed. The overhead product thus obtained exhibited a vitamin A potency of 39,800 I. U./gram, the potency of the bottoms product being 2,240 I. U./gram. This represented a recovery in the overhead product of 78.7 per cent of the vitamin content of the oil feed.

*Example V*

A commercial menhaden oil having a vitamin D potency slightly lower than 75 U. S. P. units was subjected to treatment with a propane solvent in a combined extraction and rectification tower having an inside diameter of 2 in. and 18 ft. high. The oil charge had an A. P. I. gravity of 20.5°, and "E" value of 0.10 (indicating a vitamin A potency of 200 I. U./gram), an iodine number of 192, a saponification number of 189 and contained 0.77 weight per cent unsaponifiables and 1.8% free fatty acids. The propane solvent was charged to the tower at a point 16 ft. from the top at a rate of 29,250 ccs. per hour. The oil was charged to the tower at a point 4 ft. from the top at a rate of 1,019 ccs. per hour. By means of heating elements in the tower a temperature gradient was maintained in the tower whereby the bottom temperature was 166° F., the temperature at the oil feed point was 180° F. and the top temperature was 193° F. The tower was maintained at a pressure of 570 pounds per sq. inch. During a 20 hour test period, after equilibrium conditions were established in the tower, the oil charge was recovered in the overhead at the rate of 139 grams per hour and in the bottoms at the rate of 804 grams per hour. This represented a recovery of 99.4 weight per cent of the oil charge. The oil recovered overhead from the upper phase had an "E" value of 0.17, and iodine number of 129 and contained 4.57 weight per cent unsaponifiables and 9.75 weight per cent free fatty acids. The bottoms product of this operation has an "E" value of 0.08 and an iodine number of 198 and contained 0.54 weight per cent unsaponifiables and 0.42 weight per cent free fatty acids.

Since the degree of concentration indicated by the change in the "E" value achieved in the foregoing operation was less than the desired degree of concentration the overhead product of the above operation was combined with a further quantity of the menhaden oil in the proportion of 22.7 weight per cent of overhead product and 77.3 weight per cent original menhaden oil. This blended charge oil had an unsaponifiables content of 1.72 weight per cent. This blended oil charge was treated with propane in the same tower under conditions effective to produce a greater concentration of the vitamin D content than in the first operation. In this second operation the bottom temperature was maintained at 171° F. The temperature at the oil charge point, in this case 10 feet below the top of the tower, was 179° F. and the top temperature was 197° F. Propane was charged at a point 16 feet below the top of the tower at the rate of 25,380 ccs. per hour and the blended oil charge was introduced into the tower at the rate of 1,057 ccs. per hour. During a test period of 2¾ hours, after equilibrium conditions were reached, the oil charge was recovered as overhead product at the rate of 103 grams per hour and as bottoms product at a rate of 881 grams per hour. This represented 100% recovery of the oil. The overhead product of this operation contained 10.27 weight per cent unsaponifiables, and 20.7 weight per cent free fatty acids and had an "E" value of 0.48. The overhead oil product thus obtained was treated in a propane solution consisting of 7.3 parts by volume of propane for each part of oil with a 4 N potassium hydroxide solution. An amount of potassium hydroxide solution equivalent to 22% of the oil charge was employed at a temperature of 80° F. After separation of the resulting soaps and washing of the oil with salt solution and fresh water the oil product had an "E" value of 0.54 (indicating a vitamin A potency of 1,080 I. U./gram), an unsaponifiables content of 9.64 weight per cent, and a free fatty acid content of 6.5 weight per cent. This product was tested for its vitamin D potency by a biological test in accordance with the method set forth in U. S. Pharmacopoeia XI. This indicated a vitamin D potency of 500–600 U. S. P. units. This represented approximately a seven-fold concentration of the vitamin D content of the original oil.

*Example VI*

A sardine body oil having an A. P. I. gravity of 20.8°, a saponification number of 192.3, an iodine number of 188.3, a content of unsaponifiables of 0.65 weight per cent, and a content of free fatty acids of 1.15 weight per cent, was subjected to fractionation in the same apparatus used in Example V to produce a vitamin D concentrate. This charge oil had a vitamin D potency of about 98 chick units per gram as determined by the A. O. A. C. method. This oil was charged into the tower at a point 4 ft. from the top at a rate of 3,040 ccs. per hour. Propane was charged to the tower at a point 16 ft. from the top at a rate of 90,000 ccs. per hour. The tower was maintained at 170° F. at the bottom, 176° F. at the oil charge point and at 178° F. at the top. The tower was maintained at a pressure of 520 pounds per square inch.

Under these conditions the oil was recovered in the overhead at the rate of 1,440 grams per hour and in the bottom product at the rate of 1,390 grams per hour. This represented complete recovery of the oil during a test period of 34 hours. The overhead product had an A. P. I gravity of 21.5°, a saponification number of 193.8, an iodine number of 169.9, a content of unsaponifiables of 0.86 weight per cent and a free fatty acid content of 2.02 weight per cent. The bottom product of this operation, which represented 48.9 volume per cent of the oil charge, had an A. P. I. gravity of 20.5°, a saponification number of 193.8, an iodine number of 213.9, an unsaponifiables content of .27% and a free fatty acid content of .55%. This bottoms product exhibited a vitamin D potency of only 2 chick units per gram but had improved properties as a drying oil, as compared to the original oil, as a result of the change in the iodine number from 188.3 to 213.9.

The overhead product of the first operation in this example was then subjected to retreatment in the same tower under conditions designed to produce a higher concentration of the vitamin D product. In this operation the oil was charged to the tower at a point 10 ft. from the top at a rate of 970 ccs. per hour, and propane was charged at a point 16 ft. from the top at a rate of 50,000 ccs. per hour. In this operation a temperature at 179° F. was maintained in the bottom of the tower while the temperatures at the oil charge point and the top of the tower were 180° F. and 203° F. respectively. Under these conditions 22.1 volume per cent of the oil charge (11.3 volume per cent of the original oil charge) was obtained as an overhead product having an A. P. I. gravity of 22.8°, a saponification number of 194.9, an iodine No. of 105.7, an "E" value of 0.43, an unsaponifiables content of 3.66% and a free fatty acid content of 8.7%. This oil had a vitamin D potency of 506 chick units per gram, which represented five-fold concentration of the vitamin D content of the original oil. Destearinization of this oil produced a still further increase in the vitamin potency as represented by an increase in the "E" value from 0.43 to 0.56, the last figure indicating a vitamin A potency of 1,120 I. U./gram.

The bottom product of the last mentioned operation representing 77.9% of the oil charge (39.8 volume per cent of the original oil) had an A. P. I. gravity of 21.2°, a saponification number of 191.8, an iodine number of 186.7, an unsaponifiables content of 0.31 weight per cent and a free fatty acid content of 0.16 weight per cent. This oil had a vitamin D potency of the same order of magnitude as the original oil charged to the first concentrating step in this example and was suitable for recycling to that operation for further concentration.

The "E" value referred to in Examples V and VI was obtained by spectrographic analysis and is the extinction coefficient of a 1% solution of the oil tested in iso-propyl alcohol at 328 millimicrons.

We claim:

1. A continuous process for preparing a vitamin concentrate from a charge oil containing at least one vitamin from the group consisting of vitamin A and vitamin D, by fractionation with a low-boiling solvent in its paracritical state in a vertically extended fractionation zone having a solvent inlet and a raffinate phase outlet near the lower end, an extract phase outlet near the upper end, and a charge oil inlet in the intermediate portion of said zone, which process includes the steps of: continuously introducing said charge oil and said solvent into said charge oil and solvent inlets, respectively; adjusting the temperatures within said fractionation zone to paracritical values adapted to produce an extract fraction which, exclusive of reflux liquid, is not greater than the reciprocal of the desired concentration factor; and withdrawing extract and raffinate phases from said extract phase outlet and said raffinate phase outlet respectively; separating vitamin concentrate from said extract phase and flowing said vitamin concentrate downwardly from the upper portion of said fractionation zone to counter-currently contact and rectify said upflowing extract phase; maintaining the relationship between operating factor (F), performance factor (E) and per cent of free fatty acids in extract (A) so that $$F - 850E + 40A = \pm 750$$

and recovering a vitamin concentrate product from said extract phase.

2. A continuous process for preparing a vitamin concentrate from a charge oil containing at least one vitamin from the group consisting of vitamin A and vitamin D, by fractionation with a solvent having a critical temperature less than about 450° F. and in its paracritical state, said fractionation being carried out in a vertically extended fractionation zone having a solvent inlet and a raffinate phase outlet near the lower end, an extract phase outlet near the upper end, a charge oil inlet in the intermediate portion of said zone, and a reflux inlet above said charge oil inlet, which process includes the steps of: continuously introducing into said fractionation zone said charge oil and said solvent in a volumetric solvent to oil ratio of at least 20; adjusting the temperatures within said fractionation zone to paracritical values adapted to produce an extract fraction which, exclusive of reflux liquid, is not greater than the reciprocal of the desired concentration factor, and withdrawing extract and raffinate phases from said extract phase outlet and said raffinate phase outlet respectively; recovering a vitamin oil concentrate from said withdrawn extract phase and returning said concentrate to said zone through said reflux inlet to counter-currently contact and rectify said upflowing extract phase; maintaining the relationship between propane to oil ratio (P), temperature (T) by which the critical temperature of the extract phase exceeds the temperature at the top of said fractionation zone, ratio (R) of refluxed oil to charge oil, per cent (B) of vitamins charged but not in extract phase, concentration factor (C), and per cent (A) of free fatty acids in extract phase so that $$3P^{\frac{1}{2}}T^{\frac{1}{4}}R - \frac{850C}{B} - 40A = \pm 750$$

and recovering a vitamin concentrate product from said extract phase.

3. A continuous process for preparing a vitamin concentrate from a charge oil containing at least one vitamin from the group consisting of vitamin A and vitamin D, by fractionation with a solvent having a critical temperature less than about 450° F. and in paracritical state, said process being carried out in a vertically extended fractionation zone having a solvent inlet and a raffinate phase outlet near the lower end, an extract phase outlet near the upper end, and a charge oil inlet in the intermediate portion of said zone, which process includes the steps of: continuously introducing into fractionation zone said charge oil and said solvent at a rate of at least 20 volumes of solvent to one volume of oil; adjusting the temperatures within said fractionation zone to paracritical values adapted to produce an extract fraction which, exclusive of reflux liquid, is not greater than the reciprocal of the desired concentration factor, and withdrawing extract and raffinate phases from said extract phase outlet and said raffinate phase outlet respectively; maintaining the extract phase in the upper portion of said fractionation zone at temperatures within the paracritical range and higher than temperatures at lower elevations within the zone to precipitate a downflowing reflux liquid to counter-currently contact and rectify said upflowing extract phase; maintaining the relationship between propane to oil ratio (P), temperature (T) by which the critical temperature of the extract phase exceeds the temperature at the top of said fractionation zone, temperature differences (G) between highest and lowest temperatures in said fractionation zone, per cent (B) of vitamins charged but not in extract phase, concentration factor (C), and per cent (A) of free fatty acids in extract phase so that $$P^{\frac{1}{2}}T^{\frac{1}{4}}G - \frac{850C}{B} - 40A = \pm 750$$

and recovering a vitamin concentrate product from said extract phase.

4. A process as described in claim 1 in which said solvent is normally gaseous hydrocarbon.

5. A process as described in claim 1 in which said solvent is propane.

6. A continuous process for preparing a vitamin concentrate from a charge oil containing at least one vitamin from the group consisting of vitamin A and vitamin D, by fractionation with a solvent having a critical temperature of less than about 450° F. and in a paracritical state, said process being carried out in a vertically extended fractionation zone having a solvent inlet and a raffinate phase outlet near the lower end, an extract phase outlet near the upper end and a charge oil inlet in the intermediate portion of said zone, which process includes the steps of: continuously introducing said charge oil and said solvent into a vertically extended fractionation zone having a solvent inlet and a raffinate phase outlet near the lower end, an extract phase outlet near the upper end, and a charge oil inlet in the intermediate portion of said zone; separately withdrawing extract and raffinate phases from said extract phase outlet and said raffinate phase outlet respectively, said extract phase having a temperature in the paracritical range; separating solvent from at least a part of said extract phase to produce a reflux liquid having substantially higher density than said extract phase, and flowing said reflux liquid downwardly in said fractionation zone to contact and rectify said upflowing extract phase; maintaining the rate of flow of said reflux liquid to produce at some point within said fractionation zone a reflux flow rate exceeding 25% of the rate at which oil is charged to said fractionation zone; maintaining solvent introduction at said solvent inlet at a rate in excess of 20 volumes of solvent to one volume of charge oil; and recovering a vitamin concentrate product from said extract phase.

7. A process as described in claim 10 in which said step of separating solvent from part of said extract phase is accomplished by increasing the temperature of said extract phase within said fractionation zone to precipitate a downflowing reflux liquid.

8. A continuous process for preparing a vitamin concentrate from a charge oil containing at least one vitamin from the group consisting of vitamin A and vitamin D, by fractionation with a low-boiling solvent in its paracritical state in a vertically extended fractionation zone having a solvent inlet and a raffinate phase outlet near the lower end, an extract phase outlet and reflux inlet near the upper end, and a charge oil inlet in the intermediate portion of said zone, which process includes the steps of: continuously introducing said charge oil and said solvent into said fractionation zone; separately withdrawing extract and raffinate phases from said extract phase outlet and said raffinate phase outlet respectively; separating solvent from at least a part of the withdrawn extract phase to produce a reflux liquid having a substantially higher density than said extract phase; introducing said reflux liquid at said reflux inlet at a rate exceeding 25% of the rate at which said charge oil is introduced into said fractionation zone; maintaining solvent introduction at said solvent inlet at a rate in excess of 20 volumes of solvent to one volume of charge oil; and recovering a vitamin concentrate product from said extract phase.

9. A continuous process for preparing a vitamin concentrate from a charge oil containing at least one vitamin from the group consisting of vitamin A and vitamin D, by fractionation with a low-boiling solvent in its paracritical state in a vertically extended fractionation zone having a solvent inlet and a raffinate phase outlet near the lower end, an extract phase outlet and reflux inlet near the upper end, and a charge oil inlet in the intermediate portion of said zone, which process includes the steps of: continuously introducing said charge oil and said solvent into said fractionation zone; separately withdrawing extract and raffinate phases from said extract phase outlet and said raffinate phase outlet respectively; separating solvent from at least part of the withdrawn extract phase to produce a reflux liquid having substantially higher density than said extract phase and introducing said reflux liquid into said fractionation zone at said reflux inlet; maintaining a gradient of temperature increasing in the direction of flow of said extract phase in said fractionation zone to cause precipitation of downflowing reflux liquid within said fractionation zone; maintaining the rate of flow of said reflux liquid from both sources to produce at some point within said fractionation zone a reflux flow rate exceeding 25% of the rate at which charge oil is introduced into said fractionation zone; maintaining solvent introduction at said solvent inlet at a rate in excess of 20 volumes of solvent to one volume of charge oil; and recovering a vitamin concentrate product from said extract phase.

10. A continuous process for preparing a vitamin concentrate from a charge oil containing at least one vitamin from the group consisting of vitamin A and vitamin D, by fractionation with a low-boiling solvent in its paracritical state in a vertically extended fractionation zone having a solvent inlet and a raffinate phase outlet near the lower end, an extract phase outlet near the upper end, a charge oil inlet in the intermediate portion of said zone and a reflux inlet above said charge oil inlet, which process includes the steps of: continuously introducing into said fractionation zone said charge oil and said solvent in a volumetric solvent to oil ratio of at least 20; separately withdrawing extract and raffinate phases from said extract phase outlet and said raffinate phase outlet respectively; separating solvent from at least part of the withdrawn extract phase to produce a reflux liquid having substantially higher density than said extract phase and introducing said reflux liquid into said fractionation zone at said reflux inlet; maintaining a gradient of temperature increasing in the direction of flow of said extract phase in said fractionation zone to cause precipitation of downflowing reflux liquid within said fractionation zone; maintaining the rate of flow of said reflux liquid from both sources to produce at some point within said fractionation zone a downflow of vitamins exceeding the rate at which vitamins are introduced into said fractionation zone in said charge oil; and recovering a vitamin concentrate product from said extract phase.

11. A process as described in claim 10 in which the charge oil is menhaden oil and the vitamin concentrate is vitamin D, and said reflux liquid contains at some point in said fractionation zone a downflow of vitamin D exceeding the rate at which vitamin D is introduced into said fractionation zone in said charge oil.

12. A continuous process for preparing a vitamin concentrate from a charge oil containing at least one vitamin from the group consisting of vitamin A and vitamin D, by fractionation with a solvent having a critical temperature less than about 450° F. and in a paracritical state said process being carried out in a vertically extended fractionation zone having a solvent inlet and a raffinate phase outlet near the lower end, an extract phase outlet near the upper end, a charge oil inlet in the intermediate portion of said zone, and a reflux inlet above said charge oil inlet, which process includes the steps of: continuously introducing into said fractionation zone said charge oil and said solvent in a volumetric solvent to oil ratio not less than the concentration factor; separately withdrawing extract and raffinate phases from said extract phase outlet and said raffinate phase outlet respectively; maintaining a gradient of temperature increasing in the direction of flow of said extract phase in said fractionation zone to cause precipitation of downflowing reflux liquid within said fractionation zone; separating solvent from at least part of the withdrawn extract phase to produce additional reflux liquid having substantially higher density than said extract phase and introducing said additional reflux liquid into said fractionation zone at said reflux inlet at a rate sufficient to establish a reflux liquid from both sources to produce at some point within said fractionation zone a downflow of vitamins exceeding the rate at which vitamins are introduced into said fractionation zone in said charge oil; and recovering a vitamin concentrate product from said extract phase.

13. A process as described in claim 1 in which vitamin A in the charge oil is concentrated.

14. A process as described in claim 1 in which vitamin D in the charge oil is concentrated.

JOHN T. DICKINSON.
OLIVER MORFIT.
LEO J. VAN ORDEN.

REFERENCES CITED

The following references are of record in the file of this patent:

UNITED STATES PATENTS

| Number | Name | Date |
|---|---|---|
| 2,111,360 | Cutting | May 15, 1938 |
| 2,118,454 | Schaafsma | May 24, 1938 |
| 2,131,394 | Test | Sept. 27, 1938 |
| 2,248,619 | Freedman | July 8, 1941 |
| 2,318,747 | Buxton | May 11, 1943 |
| 2,347,460 | Buxton | Apr. 25, 1944 |